United States Patent [19]

Holsnijders et al.

[11] Patent Number: 5,720,530

[45] Date of Patent: Feb. 24, 1998

[54] HUB UNIT WITH CONNECTION BY MEANS OF CUP SPRING

[75] Inventors: Jozef Johannes Holsnijders, Leerdam; Nicolaas Kollaard, Montfoort, both of Netherlands

[73] Assignee: SKF Industrial Trading and Development Company B.V., Nieuwegein, Netherlands

[21] Appl. No.: 573,035

[22] Filed: Dec. 15, 1995

[30] Foreign Application Priority Data

Dec. 15, 1994 [NL] Netherlands ............... 9402132

[51] Int. Cl.$^6$ ............................................ B60B 21/00
[52] U.S. Cl. ............... 301/105.1; 301/112; 411/517; 411/518; 384/561; 384/903
[58] Field of Search .................... 301/105.1, 111, 301/112, 121, 122, 124.1, 131; 411/353, 517, 518, 519; 384/561, 570, 903

[56] References Cited

U.S. PATENT DOCUMENTS

| | | | |
|---|---|---|---|
| 2,487,802 | 11/1949 | Heimann | 411/518 |
| 2,595,787 | 5/1952 | Heimann | 411/518 X |
| 3,319,508 | 5/1967 | McCormick | 441/517 |
| 4,692,079 | 9/1987 | Killian et al. | 411/517 X |
| 4,881,842 | 11/1989 | Farrell et al. | 301/112 X |
| 5,352,079 | 10/1994 | Croskey | 411/518 |

FOREIGN PATENT DOCUMENTS

| | | |
|---|---|---|
| 2 331 704 | 6/1977 | France . |
| 2 482 016 | 11/1981 | France . |
| 2 511 950 | 3/1983 | France . |
| 2 689 061 | 10/1993 | France . |

*Primary Examiner*—Russell D. Stormer
*Attorney, Agent, or Firm*—Young & Thompson

[57] ABSTRACT

A hub unit comprises a wheel bearing and a driving axle stub which is situated in a correspondingly shaped, concentric opening in the rotatable ring of the wheel bearing, and in the direction of rotation interacts by unround shapes with the ring which driving axle stub has an axle end projecting from the opening in the ring. The axle end interacts with the inner periphery of a cup spring whose outer periphery is supported under pre-tension on the ring. The cup spring is accommodated in a peripheral groove provided in the axle end.

9 Claims, 2 Drawing Sheets

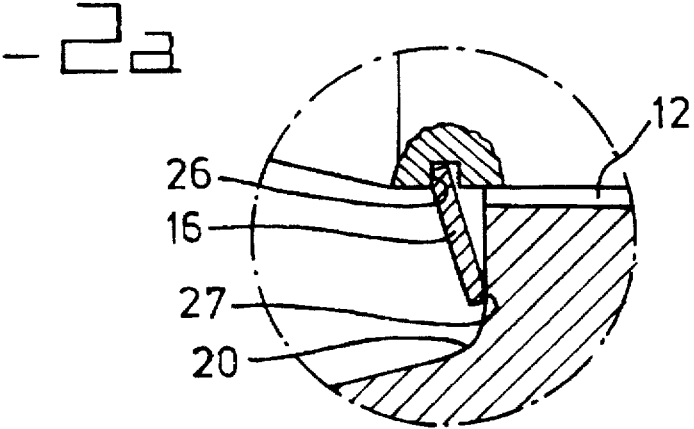
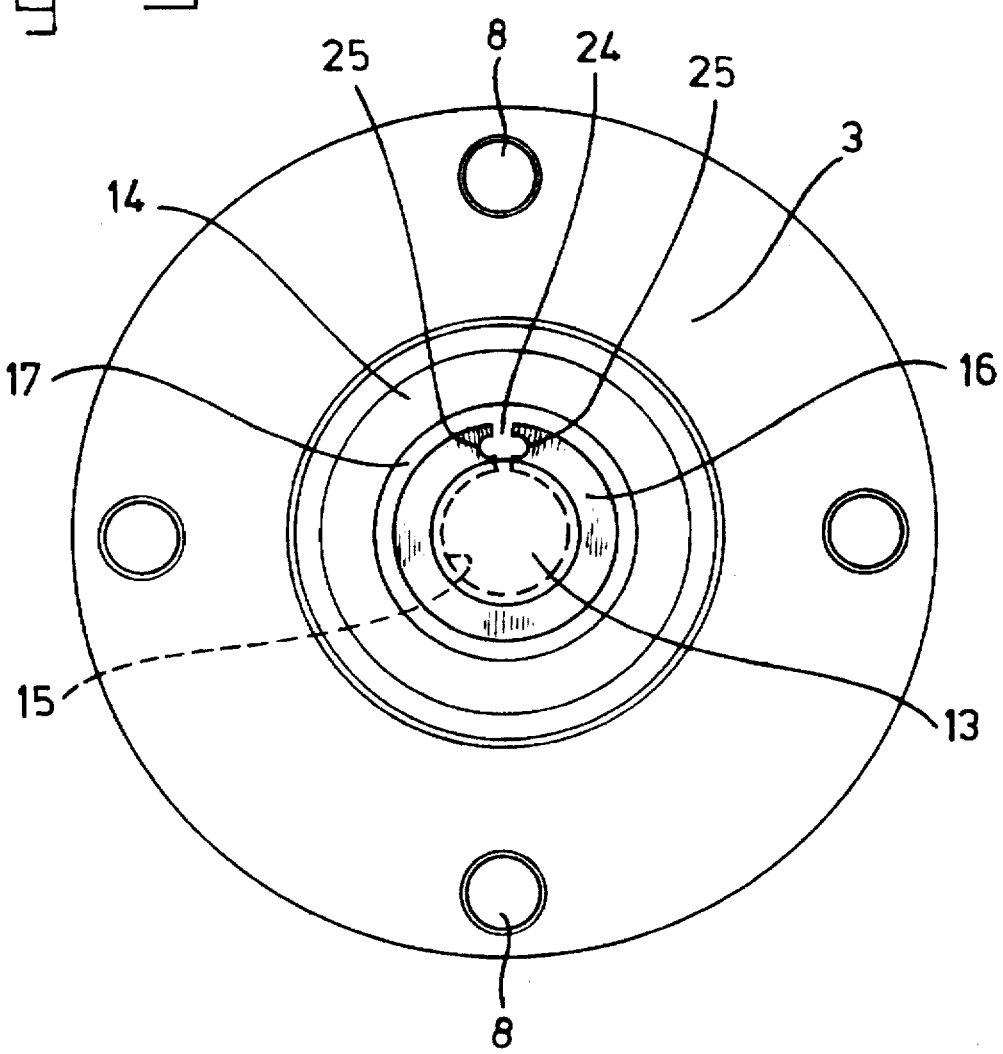

HUB UNIT WITH CONNECTION BY MEANS OF CUP SPRING

FIELD OF THE INVENTION

The invention relates to a hub unit comprising a wheel bearing and a driving axle stub which is situated in a correspondingly shaped, concentric opening in one of the rings of the wheel bearing and in the direction of rotation interacts by means of non-round shapes with said ring, which driving axle stub has an axle end projecting from the opening in said ring.

BACKGROUND OF THE INVENTION

Such a hub unit is known: the driving axle stub and the rotatable ring thereof can be provided with meshing keyways end grooves transmitting the driving couple to the rotatable ring and the wheel fixed thereto. The hub unit is held together by means of a screw thread provided on the axle end and a nut supported on the rotatable ring and interacting with said screw thread.

In the case of this known hub unit the required pre-tension is applied by tightening the screw connection with a predetermined tightening couple. This has the disadvantage that the required pre-tension is not always applied correctly, in view of the uncertainty concerning the Mount of friction In the screw connection. Besides, it is not easy to ascertain afterwards whether there has been improper removal and fitting.

SUMMARY OF THE INVENTION

The object of the invention is therefore to provide a hub unit which does not have these disadvantages. That object is achieved through the fact that the axle end interacts with the inner periphery of a cup spring whose outer periphery is supported under pre-tension on said The fixing of the driving axle stub by means of a cup spring can be carried out using a special tool. This has the advantage of quick and relatively simple fitting. In addition, it makes improper fitting and removal difficult. Removal of the cup spring is not easy without a special tool.

Removal of the cup spring involves such deformation thereof that re-use is out of the question. The advantage of this is that when the hub unit is being assembled again s new cup spring must be used, which improves the quality and reliability of the connection.

The cup spring can be accommodated in a peripheral groove provided in the axle end. In that way a simple, cheap construction is obtained. Moreover, the position of the groove can be determined accurately relative to the ring of the bearing in question, in such way that the pre-tension in the fitted cup spring can lie within narrow limits.

Moreover, the cup spring can be supported on an essentially radially running race of said ring.

In order to make the fitting easier, the cup spring can have a radial cut.

The driving axle stub is preferably accommodated in an opening formed in the inner ring, and the cup spring is supported on a face of said inner ring which is staggered inwards. Such a design is compact and low in weight.

The diving axle stub can also be provided with a shoulder at a distance from the axle end, which shoulder is supported on the side of the rotatable ring facing away from the cup spring, the distance between said shoulder and the groove in the axle end, together with the thickness of the inner ring, has an influence on the pre-tension obtained in the cup spring.

In a preferred embodiment the driving axle stub is part of a constant-velocity joint.

At least one of the edges of the cup spring, which are racing away from each other in the axial direction, is bevelled.

Preferably, both said edges are bevelled. Thereby, assembly of the hub unit is simplified, in particular in cases where the cup spring is highly preloaded. Under these circumstances, the relatively sharp edges of the cup spring might easily damage the material of the ring, leading to indentations which would prevent the cup spring from sliding into place.

Such embodiment of the cup spring is particularly fruitful in a process for assembling a hub unit, comprising the steps of sliding the rotatable ring or a wheel bearing over a driving axle stub until the axle end projects from the opening in said ring, sliding a cup spring over said axle end until its outer periphery abuts said ring, preloading said ring by further sliding its internal periphery over said axle end, until said internal periphery snaps behind an abutment on the axle end, which abutment faces the ring.

BRIEF DESCRIPTION OF THE DRAWINGS

The invention will now be explained in greater detail with reference to two exemplary embodiments shown in the figures.

FIG. 2a shows an enlargement of a longitudinal section shown in FIG. 2.

FIG. 3 shows a top view of the cup spring according to FIG. 2.

DETAIL DESCRIPTION OF THE PREFERRED EMBODIMENT

Figure 1:
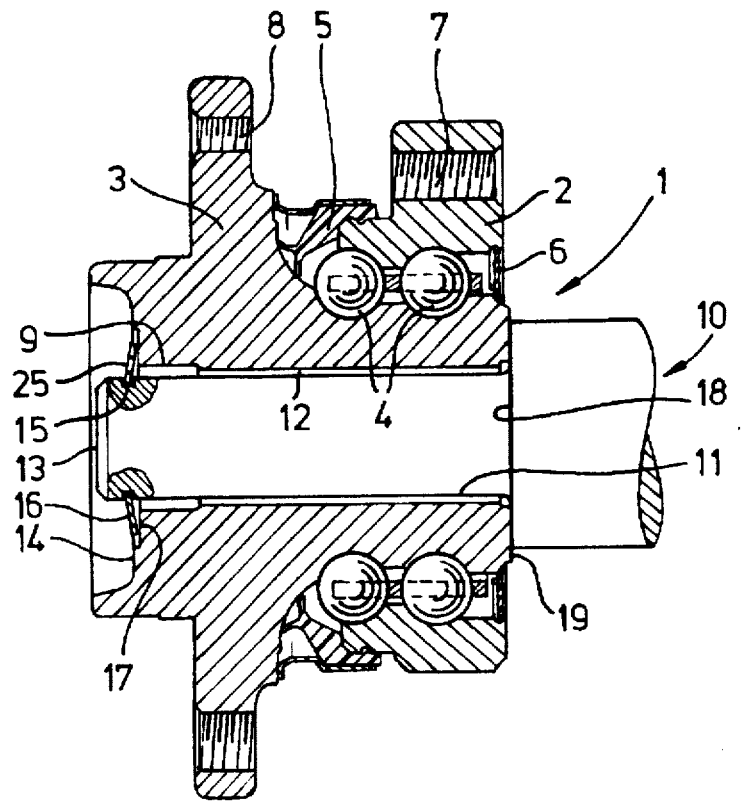
FIG. 1 shows a first exemplary embodiment of the hub unit according to the invention.

The hub unit shown in FIG. 1 comprises a wheel bearing indicated in its entirety by 1, which bearing comprises an outer ring 2 and an inner ring 3. Two rows of balls 4 are provided between outer ring 2 and inner ring 3. The bearing space in which said balls are situated is sealed off by means of seals 5. 6.

The outer ring 2 has threaded holes 7 for fixing to a wheel suspension construction. Inner ring 3 has threaded holes 8 to which a wheel can be fixed.

The inner ring 3 has a concentric opening 9, into which the axle stub, indicated in its entirety by 10, is inserted. Said axle stub has on its outer periphery keyways and key grooves 11, which project into correspondingly shaped keyways and key grooves 12 in the concentric opening 9. By means of said keyways and key grooves 11, 12 the axle stub 10 can exert a driving couple on the inner ring 3 and on the wheel fixed thereto.

The axle end 13 of the axle stub 10 projects from the opening 9, past the radial face 14 of the inner ring 3. A peripheral groove 15 in which cup spring 16 is accommodated, is provided in the periphery of the axle end 13. The cup spring rests with its outer periphery on the radial face 14, in particular on the recessed part 17 thereof. That is the cup spring is supporting on a radially running face.

At a distance from axle end 13, the axle stub 10 has a shoulder 18 which is supported against the inner ring 3. The axial distance between the radial races 19 and 14 and the recessed part 17, and also the distance between the peripheral groove 13 and the shoulder 18, is selected in such a way that the cup sprint 16 rests under pre-tension against the radial face 14 or the recess 17 when the shoulder 18 and the radial face 19 are resting against each other. This means that stipulated, constant pre-tension can remain ensured in the connection between axle stub 10 and inner ring 3.

Figure 2:
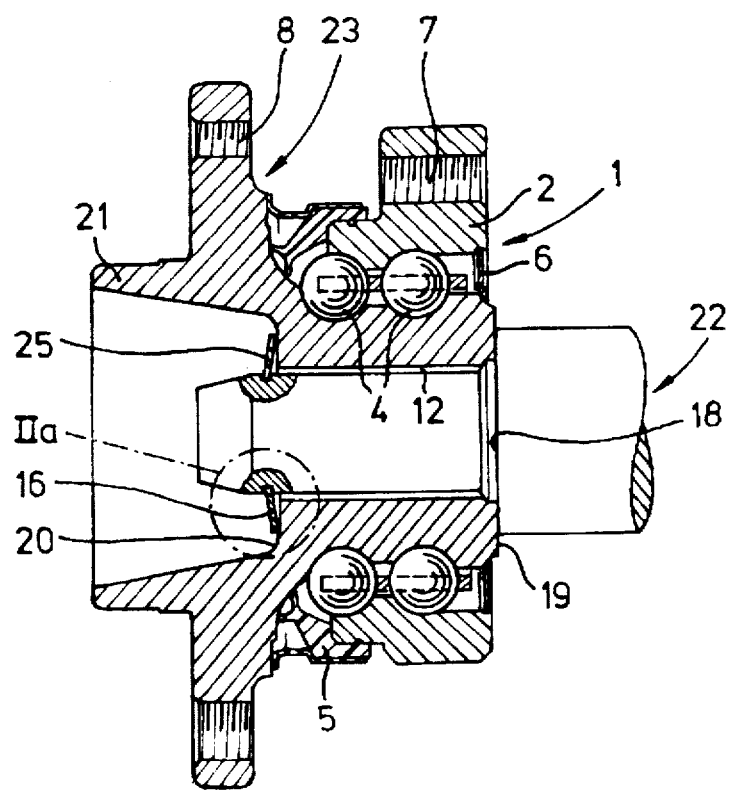
FIG. 2 shows a second exemplary embodiment.

In the exemplary embodiment shown in FIG. 2 the radial face 20 is greatly recessed relative to the centering ring 21 around which the wheel has to be fitted. This exemplary embodiment has the advantage that the axle stub 22 can remain relatively short, and the quantity of material required for the inner ring 23 is small, given the large recess. Such an embodiment is low in weight FIG. 2a shows an enlargement of the cup spring 16. The edge 26, 27 of the cup spring 16 face away from each other in the axial direction. At least one of the edge 26, 27 is bevelled.

FIG. 3 shows an axial top view of the cup spring 16 of FIG. 1 and 2 and surrounding construction. The cup spring 16 has a radial slit 24, while the facing ends of the cup spring 16 have recesses 25 on which a tool for spreading the cup spring 16 can engage.

We claim:

1. A hub unit, comprising:

a wheel bearing assembly comprising a fixed ring and a rotatable ring having a radial face;

a driving axle stub situated in a correspondingly shaped, concentric opening in said rotatable ring said rotatable ring comprising at least one race of said bearing assembly, each of said driving axle stub and said rotatable ring having mutually cooperating straight axially-extending splines, said driving axle stub having an axle end projecting from the concentric opening in said rotatable ring;

a cup spring, the axle end receiving an inner periphery of said cup spring, said cup spring having an outer periphery supported on said ring, said cup spring pretensioning an assembly of said stub and said rotatable ring.

2. A hub unit according to claim 1, wherein the cup spring (16) is accommodated in a peripheral groove (15) provided in the axle end (13).

3. A hub unit according to claim 1, wherein the cup spring (16) has a radial cut (24).

4. A hub unit according to claim 1, wherein the cup spring (16) is supported on a said radial rotatable face (14, 17, 20) of said ring (3, 23).

5. A hub unit according to claim 1, in which the driving axle stub (10, 22) is provided with a shoulder (18) at a distance from the axle end (13). Which shoulder (18) is supported on the side of the rotatable ring (3, 23) facing away from the cup spring (16).

6. A hub unit according to claim 1, wherein the driving axle stub is accommodated in an opening formed in the ring, and the cup spring is supported on a said radial face of said ring rotatable, said rotatable face of ring having a recessed part.

7. A hub unit according to claim 1, wherein the driving axle stub is part of a constant-velocity joint.

8. A hub unit according to claim 1, wherein said cup spring has edges facing away from each other in an axial direction, and at least one edge (26, 27) of the cup spring (16) is bevelled.

9. A process for assembling a hub unit having a wheel bearing assembly comprising a fixed ring and a rotatable ring, a driving axle stub situated in a correspondingly-shaped, concentric opening in said rotatable ring, said rotatable ring comprising at least one race of said bearing assembly, each of said driving axle stub and said rotatable ring having mutually cooperating straight, axially-extending splines, said driving axle stub having an axle end projecting from the concentric opening in said rotatable ring, a cup spring, the axle end receiving an inner periphery of said cup spring, said cup spring having an outer periphery supported on said rotatable ring, said cup spring pretensioning an assembly of said stub and said rotatable ring, comprising the steps of:

sliding the rotatable ring of said wheel bearing over said driving axle stub until the axle end projects from the concentric opening in said ring;

sliding said cup spring over said axle end until said outer periphery of said cup spring abuts said ring; and preloading said ring by further sliding an internal periphery of said ring over said axle end, until said internal periphery snaps behind an abutment on the axle end, said abutment facing the ring.

* * * * *